TABULATING CARD CODE CONVERTER

Filed July 2, 1963 3 Sheets-Sheet 1

INVENTOR.
WILLIAM WOCKENFUSS.
BY
J P Santo
ATTORNEY.

INVENTOR.
WILLIAM WOCKENFUSS.
BY
J.P. Santo
ATTORNEY.

INVENTOR.
WILLIAM WOCKENFUSS.
BY
J P Santo
ATTORNEY.

United States Patent Office 3,324,284
Patented June 6, 1967

3,324,284
TABULATING CARD CODE CONVERTER
William Wockenfuss, Farmington, Mich., assignor to Burroughs Corporation, Detroit, Mich., a corporation of Michigan
Filed July 2, 1963, Ser. No. 292,315
20 Claims. (Cl. 235—61.11)

This invention relates to tabulating card converters, and more particularly, to a card converter utilizing a magnetic storage device that is mechanically shiftable relative to the magnetic reading and/or recording elements associated therewith.

The invention has for its general object to provide a tabulating card converter of the above character suited for parallel sensing of information recorded on a tabulating card and converting such information into serial form for input to a serial type utilization device.

Related objects are to provide a card converter having a buffer storage device utilizing a cyclically accessible revolving magnetic storage drum or belt that is shiftable transversely of its path of movement relative to the magnetic reading and/or recording elements thereof.

A parallel to serial card converter in accordance with the invention includes a card reading station having a plurality of sensing elements for simultaneous sensing of recorded positions of a row of index points of a tabulating card, a card feeder transporting the card row by row past the sensing elements, a cyclically accessible magnetic storage device synchronized with the row by row sensing of the card and having a plurality of recording elements coupled to and corresponding in number to the number of card sensing elements for simultaneous magnetic recording on a longitudinally extending track on the surface of the device the information recorded in a sensed row of index points of the card, means shifting the magnetic storage device relative to the recording elements to record successive tracks of information thereon from successive rows of card index points successively presented to the sensing elements, and a plurality of magnetic reading elements corresponding in number to the number of rows of card index points and each cooperating with a different track of the magnetic storage device to sense successive portions thereof corresponding to successive columns of the card as each recorded track is presented to its corresponding reading element.

In accordance with one form of the invention, a plurality of stationary magnetic recording or write heads corresponding in number to the number of sensing elements and each coupled to a different sensing element of a row by row card reading station are disposed transaxially and partially about the periphery of a rotating magnetic storage drum. The drum is shifted axially in one direction synchronously with the movement and sensing of the card during an initial part of the revolution of the drum to record information from successive rows of the card on a portion of the drum surface in a pattern of axially spaced, parallel, longitudinally shifted magnetic tracks. The shifting of the drum is then interrupted and successive portions of each track of the pattern are presented during the continued rotation of the drum to a series of twelve axially and circumferentially spaced, stationary magnetic reading heads each aligned with a different recorded track. After the entire drum magnetization pattern has been swept past the read heads, the drum is rapidly shifted axially in the opposite direction to return the drum to its initial axial position during the remaining portion of its cyclical rotation.

In accordance with another form of the invention, the read heads are moved with the rotating drum which is continuously shifted axially relative to the stationary write heads during the row by row recording of information from the card on the surface of the drum after which the magnetized pattern on the surface of the rotating drum is presented to and read by the read heads during the axial return movement of the drum to its initial axial position.

In still another form of the invention the magnetic recording heads are shifted axially or laterally transversely of a magnetic storage device in the form of a revolving or traveling magnetic drum, tape or endless belt having a plurality of stationary magnetic reading or sensing heads to which the magnetized pattern on the storage device is presented.

Illustrative examples and structural forms of carrying out the invention, together with the advantages and features thereof, will appear more fully from the following detailed description and drawings, wherein.

Figures 1, 2, 2A, 3, 3A:
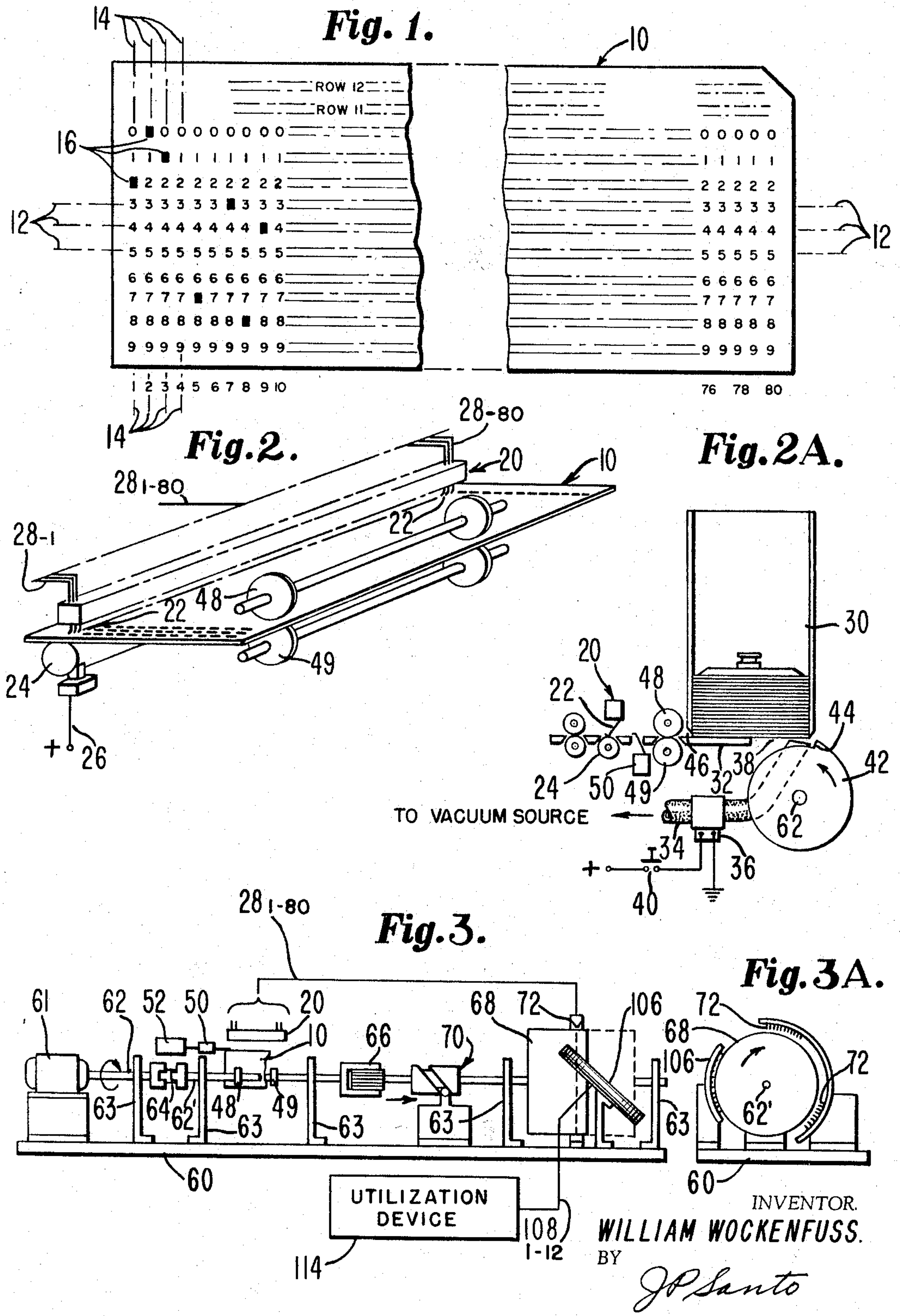
FIG. 1 is a standard 80 column tabulating card as may be processed by the card converter of the present invention.
FIG. 2 is an isometric view of a form of card sensing device that may be utilized in the present invention.
FIG. 2A illustrates a card picker feeding device that may be used with the present invention.
FIG. 3 is a simple diagrammatic mechanical illustration of the cooperating and basic components employed in a form of parallel to serial card converter in accordance with the present invention.
FIG. 3A is an end view of the recording drum used in the apparatus of FIG. 3.

Referring to the drawings, FIG. 1 illustrates a standard 80 column tabulating card 10 including twelve horizontal rows, 12, 11, 0, 1 through 9, of index points 12 each designating a different value of information and containing 80 different information recording positions distributed in columns 14 extending vertically or transversely of the card rows. As is well known, information is recorded in selected columns of the card by making perforations 16 at different index points or rows thereof.

The information on the card is sensed by a card reader, a brush type form 20 of which is shown in FIG. 2 in which a card 10 is transported in a direction transversely of the longitudinal extent of the rows 12 of index positions past a row of flexible, electrically conductive feeler brushes 22, there being a separate brush aligned with each recording position of a row of index points of the card. As the card is fed through the reader, the rows of index points are presented in succession to the feeler brushes which simultaneously sense in parallel all of the perforations contained in the card row presented to the parallel sensing brushes. When an aperture 16 is present at one of the recording positions of a row of index points, a feeler brush will extend through the aperture to contact an electrically conductive roller 24 and complete an electrical circuit from one side of a source of potential 26 through the activated brush. The presence or absence of a perforation in each of the recording positions of the sensed row of the card is simultaneously manifested in the form of the presence or absence of an electrical signal pulse on corresponding ones of each of a plurality of 80 parallel conductor lines $28_{1-80}$, each of which is connected to a different sensing brush. The information on the card fed past the reading station is thus sensed or supplied over 80 parallel lines, each of which supplies twelve serial or successive bits of information.

The cards to be processed are stacked in a card-picking device, a suitable form of which is shown in FIG. 2A. The picking device includes a vertical rack 30 that receives the cards in stacks and a stack support plate 32 which extends substantially half the card width. Connected to a vacuum source (not shown) is a pipe 34, which includes a solenoid operated valve 36 and extends to a point just below the stack of cards adjacent the portion of the lowest card in the stack exposed in the opening 38 and beyond the edge of the support plate. Actuation of the solenoid valve upon demand or from an external source as 40 applies vacuum pressure to bend the edge of the bottom card of the stack downwardly to engage a rotating picker wheel 42 having a peripheral picker lug 44 positioned to engage the edge of the bottom card when it is pulled down by the vacuum pipe. The engaging lug of the wheel pushes the card forward, sliding the bottom card out from beneath the stack past the separator throat 46, a pair of feed rollers 48, 49 and a card sensing switch 50. Switch 50 completes an electrical energizing circuit for a solenoid clutch actuator, denoted at 52 in FIG. 3, to apply drive power to the feed rollers 48, 49 and feed the card past the cooperating feeler brushes 22 and conductive roller 24 of the sensing station 20.

In order to convert information sensed row by row into a form representing the index point value of the recorded information in each column of the card for presentation in serial or column by column form to a serial type utilization device, a parallel to serial converter in the form of a buffer storage device is employed. The storage device stores the information from the card in a total of 960 different memory or storage locations into which the information is entered or loaded in the form of twelve 80 bit parallel words and from which information is then serially extracted to generate 80 successive twelve bit parallel words.

The present invention employs a cyclically accessible storage device in the form of a magnetic storage drum or belt that is shiftable transversely relative to the plane of the magnetic recording elements thereof during the card sensing and the magnetic recording portion of its operating or rotational cycle. The information from the card is thus recorded in parallel tracks displaced axially and circumferentially or longitudinally of the surface of the drum or belt and in the formation of a parallelogram bounded magnetization pattern on a part of the length of the peripheral surface of the drum or belt. The pattern is then presented in a subsequent portion of the revolution of the storage device to a group of magnetic reading elements that are aligned with corresponding tracks of the pattern which is successively presented to or intercepted by the reading elements.

As may be understood with reference to the generalized schematic representation of FIG. 3, there is shown mounted on an extended base or support 60 an electrical drive motor 61, the drive shaft 62 of which is supported at axially spaced intervals 63 and is coupled through a one revolution clutch 64 under the control of card sensing switch 50 and solenoid actuator 52 to drive a card 10 through the card feeder and reader 20 past the sensing brushes 22. Through an axially extensible, helically splined coupling 66, the clutched section 62' of drive shaft 62 further drives a magnetic storage drum 68 which is displaceable axially during its rotation by a box cam or equivalent shifting device, indicated at 70. As the card is fed row by row past the sensing brushes 22, pulses representing the presence of perforations in different columnar recording positions of the sensed row are supplied over conductor lines $28_{1-80}$ extending between the activated brushes and corresponding stationary magnetic recording elements 72, one of which is provided for each brush of the sensing station. Eighty recording elements magnetically isolated from each other are located in a plane transaxial or normal to the rotational axis of the drum and are equally arcuately or angularly spaced about a portion of the circumference and in close proximately to the magnetizable magnetically coated surface thereof as indicated in FIG. 3A. Information from the sensed row of the card is thus instantaneously recorded in parallel on a longitudinal track at positions therealong corresponding to the location of the recording elements at the instant they are pulsed by the hole-finding sensing brushes.

Figures 4A, 4B, 4C, 4D, 4E, 5:
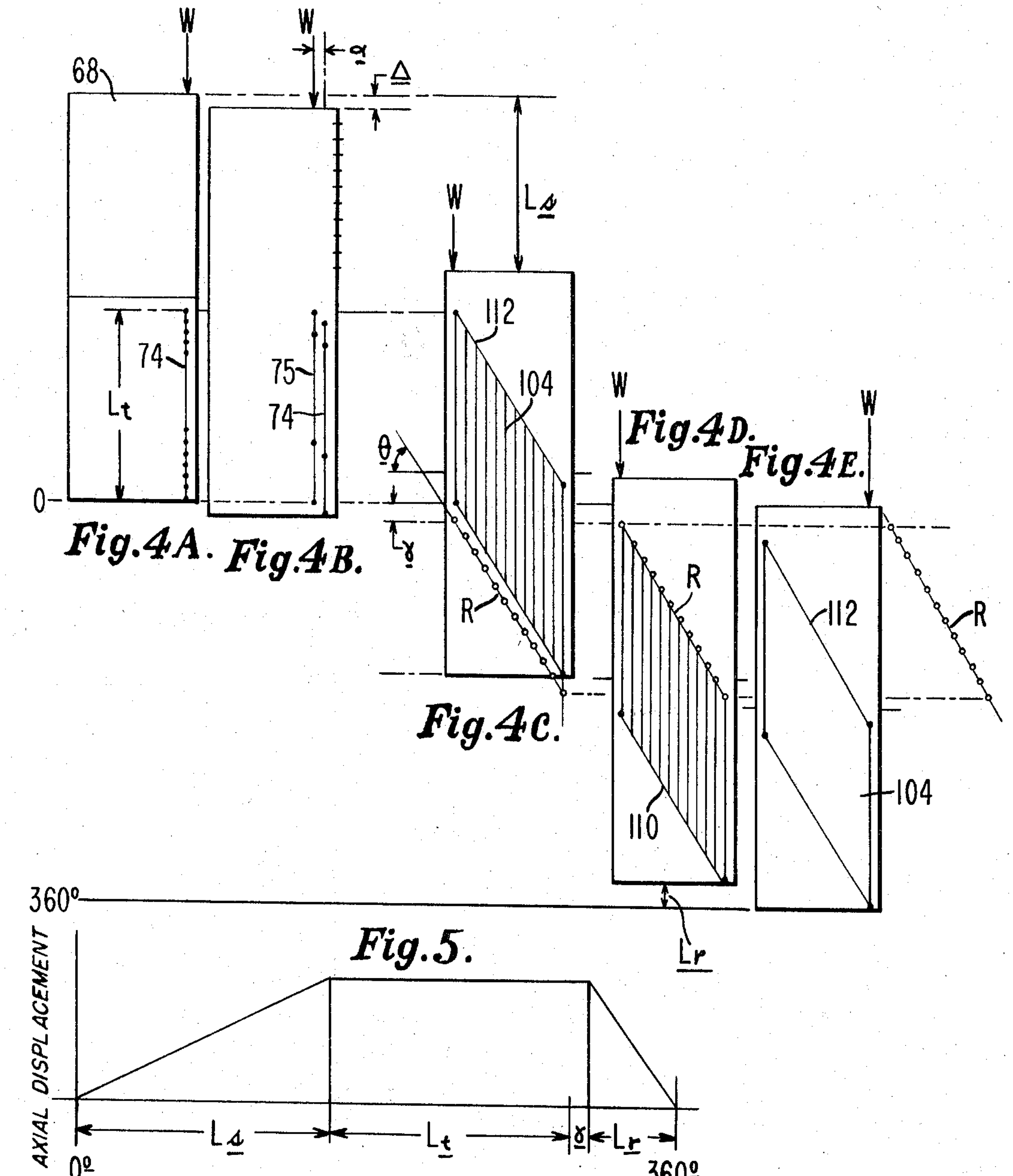
FIGS. 4A–4E depict the unwrapped surface of the drum in different advancing portions of a revolution thereof.
FIG. 5 illustrates the axial displacement pattern of the drum employed in the embodiment of the invention of FIG. 3.

The above mentioned recording track is shown at 74 in FIG. 4A, which depicts the unwrapped circumferential surface of the drum in an initial axial position relative to the plane W of the recording heads and at the instant of sensing the first row, Row 12, of the card. The length of the track corresponds to the arcuate distance or portion of the circumference of the drum collectively spanned by the recording elements and provides a total of 80 cells or storage locations therealong for recording at each location a bit of information representing the presence or absence of a perforation in the corresponding column or recording position of the sensed row of index points of an 80 column tabulating card.

Figure 6:
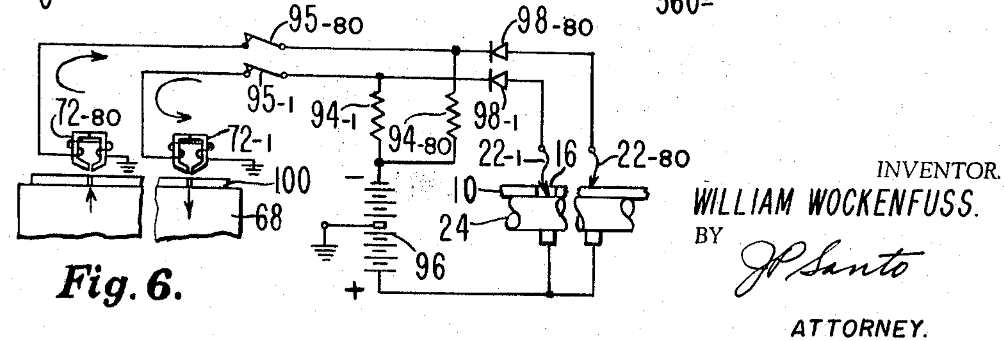
FIG. 6 is a schematic electrical diagram of a recording head circuit that may be employed in the present invention.

By connecting the recording elements in the manner and circuit of FIG. 6, the recording elements or write heads 72 may be utilized to erase information previously recorded on the track or surface of the drum as new information is being written or recorded thereon, thereby eliminating the need for separate erasing heads for the drum unless otherwise desired. Each recording head 72 is connected through a separate current limiting resistor 94 and switch 95 to the negative or low potential side of a D.C. source of power 96, the mid-potential point of which is grounded. The positive or high potential side of the power source is connected to conductive roller 24 of the card reading station and is adapted to be contacted by a feeler brush 22 extending through an aperture 16 in the card 10. The feeler brush is connected to the anode of a diode 98 whose cathode is connected to resistor 94 and switch 95 connected to the recording head. Each writing head is thus energized to polarize the magnetically coated magnetizable surface 100 of the drum in one direction except when its corresponding feeler brush senses an aperture upon which the current flow through the head reverses to polarize the recording track in the opposite direction, thereby recording a bit representing the presence of an aperture.

As the rotation of the drum is synchronized with the indexing and sensing or reading of the card, when the next row, Row 11, of index points of the card is presented to the sensing brushes, the drum will have rotated and been circumferentially displaced from its original position a corresponding amount $\Delta$ as indicated in FIG. 4B, and, by reason of the box cam shifter device 70, it will also have been displaced axially relative to the recording elements an amount $\alpha$ as indicated by the rightward displacement of the drum relative to the stationary plane or position of the recording elements depicted by the arrow W. Thus, the information in the presently sensed row of the card will be simultaneously recorded in a parallel track 75 on the drum that is displaced axially or laterally transversely from the first recorded track 74 by the amount of the axial displacement $\alpha$ of the drum and is circumferentially shifted or longitudinally displaced relative to the first track by the amount of the rotation of the drum, as indicated in FIG. 4B. As successive rows of the card are presented to and sensed by the feeler brushes, the information on the card will be successively recorded on the surface of the drum in successive parallel tracks both axially and circumferentially or longitudinally shifted from each other to form a magnetization pattern in the form of a parallelogram 104 on a portion of the surface of the drum, as indicated in FIG. 4C. As the last row, Row 9, of the card is sensed, the drum will have shifted to the axial position indicated in dotted outline in FIG. 3 where there is provided a stationary group of twelve axially and circumferentially spaced magnetic reading elements 106 each of which is aligned in this position of the drum with a different one of the recorded tracks of the drum. The reading elements, which are similar in construction to the recording elements, are equally spaced from each other and the curved surface of the drum and are located in a plane R disposed at an angle $\theta$ to the drum rotational axis, where $\theta$ is the angle whose tangent is equal to the quotient of $\Delta$ divided by $\alpha$, and where $\Delta$ is the linear rotational or circumferential displacement of the drum and $\alpha$ the axial linear shift thereof between the sensing of adjacent card rows.

The location and disposition of the plane R of the reading heads with respect to the drum and the magnetization pattern thereon just after the last row of the card has been sensed upon the completion of the recording portion of the drum operational cycle is shown in FIG. 4C in which the plane of the reading elements is longitudinally spaced a slight amount $\gamma$ in advance of the lowermost inclined edge 110 of the magnetization pattern, the lowermost edge representing column 1 of the card and the uppermost inclined edge 112 of the pattern representing column 80. Since the recording portion $L_s$ of the drum cycle consumed or required less than half a revolution of the drum the remaining portion of the revolution of which is greater than the longitudinal length $L_t$ of the magnetization pattern, the pattern may be swept past the reading heads if the axial shifting movement of the rotating drum is interrupted. Thus, successive portions of each of the longitudinal tracks are presented to and intercepted by a corresponding one of the read heads to produce a signal pulse on a corresponding output conductor line $108_{1-12}$ each time a hole representing bit is sensed on the track sweeping by the head. Where two or more holes appear at different index points or rows in the same column of the card, representative pulses will simultaneously appear on two or more corresponding output lines of the read heads. The output conductor lines, of which one is provided for each read head, are connected to a serial type utilization device 114 to which the information from the drum is supplied in the form of 80 serial 12 bit parallel words.

The axial position to which the drum has been shifted in FIG. 4C is maintained until the entire magnetization pattern has been swept past the stationary reading heads as indicated in FIG. 4D.

By dividing the writing and reading portions of the operating cycle of the drum in the manner shown in FIG. 5, which represents the axial displacement pattern per degree of revolution of the drum under the control of the box cam shifter device 70, the latter portion $L_T$ of the operating cycle of the drum after the entire magnetization pattern has been swept past the reading elements, may be utilized to return the drum in the opposite axial direction to its initial position relative to the plane or position W of the write heads as shown in FIG. 4E in which the drum has been shifted axially leftwardly out of alignment with and beyond the read heads.

Figures 7, 8, 9, 10, 11, 12:
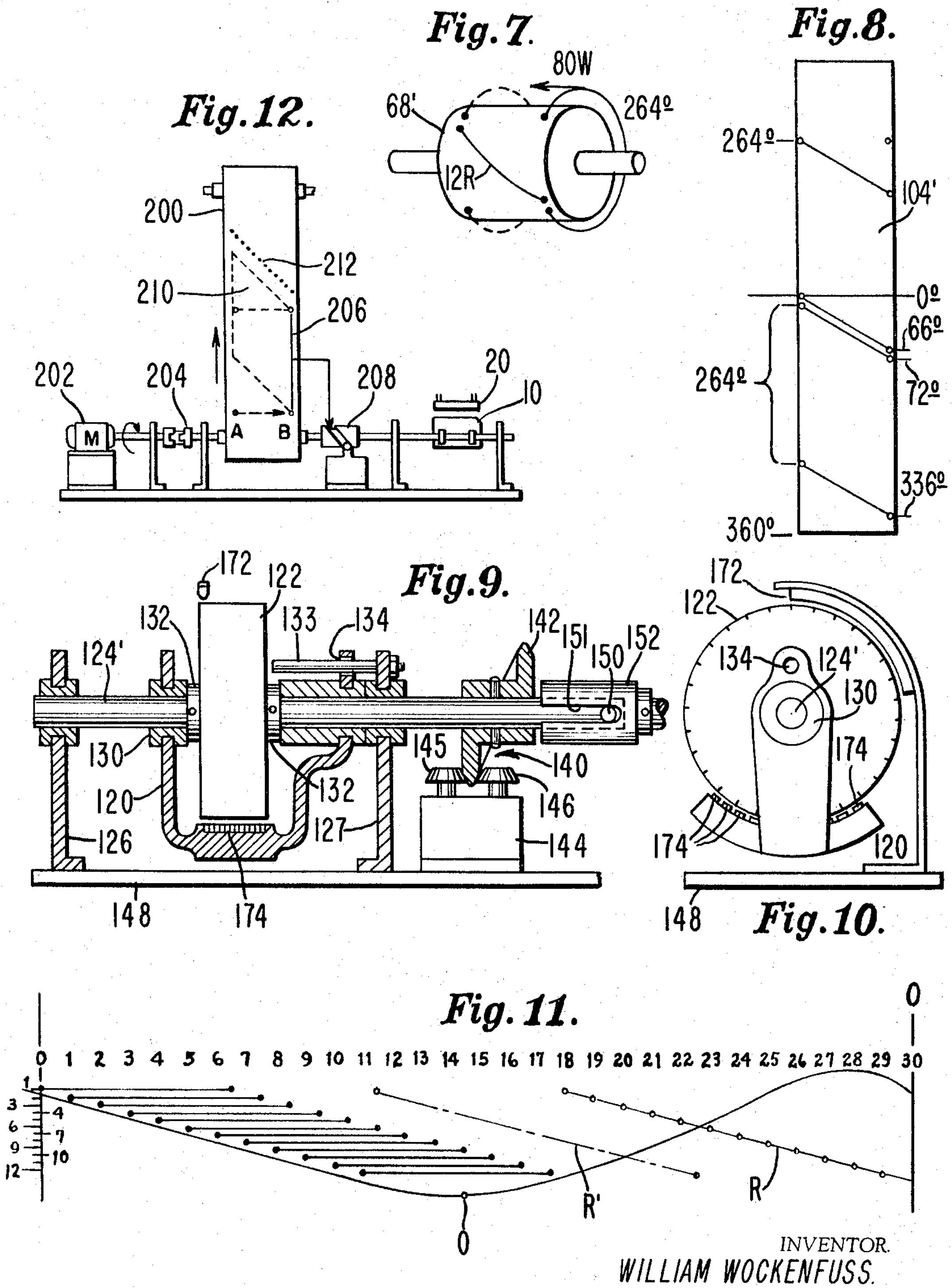
FIGS. 7 and 8 illustrate, respectively, a drum and the unwrapped surface thereof as employed with a different spacing of recording elements and a different card sensing cycle.
FIG. 9 is a mechanical representation of a modification of the card converter apparatus of FIG. 3.
FIG. 10 is an end view of the storage drum used in FIG. 9.
FIG. 11 is an axial displacement diagram of the drum as employed with the apparatus of FIG. 3.
FIG. 12 is a sketch of still another form of storage instrumentality and shifter device for use in a card converter utilizing the principles of the present invention.

With a drum type storage device, it will be appreciated that the spacing between adjacent heads, as the recording heads 72 for example, is a function of the radius of the drum and the dimensions of the recording heads, commerical forms of both of which are available in such sizes as will permit placement of the number of recording elements employed herein about any part of the periphery of the drum. By making the card sensing cycle or time allotted to move all twelve rows of the card past the sensing brushes a small portion of the drum rotational cycle, the recording heads may be spread further apart or a smaller drum can be employed to permit the magnetization pattern to be distributed over a greater portion of the circumferential length of the drum. This is illustrated in FIGS. 7 and 8 in which the write heads encircle 264 degrees of the drum and in which the magnetization pattern for the entire twelve rows of the card has been recorded by 66 degrees of the drum rotation as may be obtained with a 60 point indexing system. The magnetization pattern having been recorded in 66 degrees of drum rotation, the 264 degree pattern is swept in the next 264 degrees of drum rotation past the reading heads which are indicated as being spaced 6 degrees in advance of the pattern. This leaves an additional 24 degrees of rotation during which the drum is returned to its initial axial position.

FIG. 9 illustrtaes a form of the invention in which the reading elements are fixed against rotation but are shifted axially with the drum during the card sensing and the magnetic recording or writing portion of the drum cycle. Thereafter, the magnetic reading elements and the rotating drum are axially shifted in the return direction during which the recorded magnetization pattern is presented to the read heads, thereby to avoid rapid return movement of the drum and to utilize its return movement for the drum reading portion of the operating cycle. The latter consideration also permitting slightly longer recording and reading portions of the operating cycle.

Structurally, this is accomplished by mounting the magnetic read heads in a yoke-shaped bracket 120 spanning the width of the drum 122 on shaft 124' which is journaled for rotation in spaced upstanding supports as 126, 127. The read head yoke is supported from the shaft on sleeve bearing blocks 130 surrounding the shaft and bearing against opposite hubs 132 of the drum. An axially extending guide rod 133 fixedly supported from fixed support 127 is slidably received in and passes through an opening 134 in the yoke 120, as shown, to fix the yoke against rotation while permitting axial movement thereof with the rotating drum under the controlling influence of the axial shifter device 140. The shifter device comprises a cam portion 142 fixedly mounted on the shaft, and a camming portion asembly 144 including a pair of conical cam follower rollers 145, 146 cooperating with the cam 142 and mounted on the base support 148. A slotted coupling 150 in which shaft 124' is received and driven through a pin 152 carried by the shaft and extending through the slot 151 permits axial extensible movement of the drum shaft under the control of the shifter device as the coupling is rotatably driven from a drive source as the motor 32 of FIG. 3.

The write heads 172 are mounted in a position normal to the rotational axis of the drum and are shown spanning an approximately 78 degree interval of the drum as indicated in FIG. 10. With a 30 point system operating cycle, the sensing of the 12 rows of the card and the magnetic recording portion of the drum cycle will be completed by 132 degrees of drum rotation, as indicated in FIG. 11, which depicts the axial displacement pattern over a revolution of the drum. During the card sensing and magnetic recording portion of the drum cycle, the drum is shifted axially past the recording heads in a uniform linear manner. Following the instantaneous recording on track 12 of the information recorded in the eighty columns of the last row of the card, the axial displacement or shifting of the drum is gradually reduced in the direction of its original displacement, and is then reversed at about point O of the displacement pattern from which point it is then shifted in the opposite direction to return it to its original position. Having established a suitable displacement pattern, the configuration of the cam member 142 may be developed from the established pattern.

The read heads 174 mounted on the yoke of FIG. 10 are shown in a position R in FIG. 11 and spaced a sufficient distance in advance of the drum magnetization pattern to assure that the entire pattern will be swept past the plane of the read heads in the remaining portion of the drum rotational cycle. Since the recording portion of the drum cycle is completed at 132 degrees of the drum rotation, the read heads could, if desired, be positioned closer to the magnetization pattern and as close thereto as slightly after the eleventh index point of the drum rotation as indicated by the dashed and dotted line R'.

Since the read heads are shifted with and have the same axial displacement as the drum, there is no axial displacement of the drum magnetization pattern relative to the read heads. And since the read heads are fixed against rotation, each track of the magnetization pattern will be presented to its corresponding read head with the continued rotation of the drum to develop output pulses on different ones of the output conductor lines connected to corresponding read heads as succesive portions of the magnetization pattern representing successive columns of the card are intercepted by the read heads.

Although the write heads are shown as spanning a 78 degree arcuate portion of the drum in the embodiment of FIGS. 9, 10 and 11 providing a recording track spanning 78 degrees of the circumferential length of the drum, it can be appreciated that the write heads could be spaced a greater distance apart and span a greater portion of the drum where conditions dictate.

While in the aforementioned examples the information from the card was recorded in a circumferentially and laterally distributed magnetization pattern on the drum by shifting the drum relative to the recording elements, it will be appreciated that the recording elements may be shifted axially of the drum. The storage device, moreover, need not of necessity be a cylindrical drum but could be of a type including a flat tape or endless belt presenting an elongated or substantial expanse of a flat planar recording surface. As indicated in FIG. 12, for example, the storage device is shown as an endless or continuous belt 200 traveling at constant speed and as driven from drive motor 202 through clutch 204. The magnetic recording elements 206, distributed in a rectilinear row, are moved from position A to position B through a shifter device 208 synchronously with the sensing by the sensing station 20 of the twelve rows of the card 10 and in a direction transversely or laterally of the width of the tape or belt to record a twelve track magnetization pattern 210 thereon which is presented to a rectilinear oblique row of 12 stationary reading heads 212.

While the invention has been shown and described in terms of its application as a parallel to serial tabulating card converter, it will be appreciated that it could also be employed as a series to parallel converter where the card is sensed column by column and by correspondingly reducing the number of magnetic recording or writing heads and increasing the number of reading heads. It will also be appreciated that the storage device, as employed in the present invention, retains the recorded information thereon until new information from a subsequent card is sensed and recorded thereover. By resort to dummy or blank card cycles and opening the energizing circuit of the recording heads, information recorded on the storage device may be retained thereon as long as desired. Because of the synchronous character of the system, selected parts of the information recorded on the storage device from a master card can be selectively retained thereon as fixed or group information common to a group of cards by selectively disabling through switch 95 in each recording head circuit the corresponding recording head circuits for the subsequently fed cards of the same group. Thus, although the invention has been shown and described in terms of illustrative forms and examples embodying the principles thereof, it is apparent that various other modifications and forms may be devised within the spirit and scope thereof.

What is claimed is:

1. A tabulating card converter including a buffer storage device into which information sensed from a tabulating card is successively loaded in the form of X number of serial Y bit parallel words and is successively extracted in the form of Y number of serial X bit parallel words and in which the buffer storage device comprises a cyclically accessible, rotatable, memory drum having Y number of magnetic recording elements and X number of magnetic reading elements relative to which the rotatable memory drum is axially shiftable.

2. A tabulating card converter including a buffer storage device into which information sensed from a tabulating card is successively loaded in the form of X number of serial Y bit parallel words and is successively extracted in the form of Y number of serial X bit parallel words and in which the buffer storage device comprises a cyclically accessible, rotatable, memory drum having Y number of magnetic recording elements and X number of magnetic reading elements and in which the memory drum is axially shiftable relative to the magnetic recording elements and the magnetic reading elements are axially shiftable with the memory drum.

3. A converter for a tabulating card having a plurality of spaced rows of different information designating index positions extending in one direction of the card and a plurality of spaced columns of different information recording positions extending in a direction transversely of said rows of index positions, said converter comprising, in combination, means for feeding the card in one of said directions, sensing means in the feed path and having a plurality of parallel sensing elements aligned with and corresponding in number to the number of information positions extending in the aforesaid card feeding direction, a movable storage device having a magnetizable recording surface, means for driving the storage device for movement along a predetermined path synchronously with the feeding of the card past said sensing means, a plurality of magnetic recording elements corresponding in number to and each connected to a different one of said sensing elements to record information on the recording surface of the storage device in a track extending in the direction of movement of the storage device, means synchronized with the feeding of the card past the sensing means and shifting the storage device relative to the magnetic recording elements in a direction transversely of the aforesaid direction of movement of the storage device to cause information sensed from a card fed past the sensing means to be magnetically recorded on the storage device in a magnetization pattern of parallel, laterally spaced and longitudinally shifted tracks corresponding in number to the number of information positions on the card extending in a direction transverse to the aforesaid direction of card feed past the sensing means, and a plurality of magnetic reading elements arrayed generally transversely of the aforesaid path of movement of said storage device and corresponding in number to and each aligned with and intercepting a different one of the recorded tracks on the storage device.

4. A tabulating card converter in accordance with claim 3 above wherein said storage device is a magnetic storage drum.

5. A tabulating card converter in accordance with claim 3 above wherein said storage device is shifted relative to said magnetic recording elements and said magnetic reading elements.

6. A tabulating card converter in accordance with claim 5 above wherein the shifting of said storage device is interrupted after the magnetization pattern has been recorded on the storage device and while the pattern is presented to said magnetic reading elements after which the storage device is shifted in a direction opposite that in which it was originally shifted.

7. A tabulating card converter in accordance with claim 3 above wherein said magnetic reading elements are shifted with the storage device.

8. A tabulating card converter in accordance with claim 3 above wherein said magnetic reading elements are arrayed at an angle to the path of movement of said storage device that is a function of the lateral spacing divided by the longitudinal shift between adjacent tracks recorded on the storage device.

9. A tabulating card converter in accordance with claim 3 above including means for selectively disabling any of said magnetic recording elements.

10. A converter for a tabulating card having information recorded therein at a plurality of spaced rows of different information designating index positions extending in one direction of the card and a plurality of spaced columns of different information recording positions extending in a direction transversely of said rows of index positions, said converter comprising, in combination, means for feeding the card in one of said directions, sensing means in the feed path and having a plurality of parallel sensing elements aligned with and corresponding in number to the number of information positions extending in the aforesaid card feeding direction, a movable storage device having a magnetizable recording surface, means for driving the storage device for movement along a predetermined path synchronously with the feeding of the card past said sensing means, a plurality of magnetic recording elements corresponding in number to and each connected to a different one of said sensing elements to record information on the recording surface of the storage device in a track extending in the direction of movement of the storage device, means synchronized with the feeding of the card past the sensing means and shifting the recording elements relative to the storage device in a direction transversely of the aforesaid direction of movement thereof to cause information sensed from a card fed past the sensing means to be magnetically recorded on the storage device in a magnetization pattern of parallel, laterally spaced and longitudinally shifted tracks corresponding in number to the number of information positions on the card extending in a direction transverse to the aforesaid direction of card feed past the sensing means, and a plurality of magnetic reading elements arrayed generally transversely of the aforesaid path of movement of said storage device and corresponding in number to and each aligned with and intercepting a different one of the recorded tracks on the storage device.

11. A tabulating card converter in accordance with claim 10 above wherein said movable storage device has a flat recording surface.

12. A tabulating card converter in accordance with claim 10 above wherein said magnetic reading elements are mounted in a stationary array at an angle to the path of movement of the storage device and in advance of the recorded magnetization pattern thereon.

13. A parallel to serial card converter for a tabulating card having information recorded thereon at a plurality of spaced rows of index positions extending in one direction of the card and a plurality of spaced columns of recording positions extending in a direction transversely of said rows of index positions, comprising the combination of means for feeding the card in the direction of extent of said columns of information recording positions thereon, sensing means in the feed path and having a row of parallel sensing elements aligned with and corresponding in number to the number of columns of information recording positions on the card, a movable storage device having a magnetizable recording surface, means for driving the storage device for movement along a predetermined path synchronously with the feeding of the card row by row past said sensing means, a plurality of magnetic recording elements corresponding in number to and each connected to a different one of said sensing elements to record information on the recording surface of the storage device in a track extending in the direction of movement of the storage device, means synchronized with the feeding of the card row by row past the sensing means and shifting the storage device relative to the recording elements in a direction transversely of the aforesaid direction of movement of the storage device to cause information sensed from a card fed past the sensing means to be magnetically recorded on the storage device in a magnetization pattern of parallel, laterally spaced and longitudinally shifted tracks corresponding in number to the number of rows of information designating index positions of the card, and a plurality of magnetic reading elements arrayed generally transversely of the aforesaid path of movement of said storage device and corresponding in number to and each aligned with and intercepting a different one of the recorded tracks on the storage device.

14. A parallel to serial card converter in accordance with claim 13 above wherein said magnetic reading elements are arrayed at an angle to the path of movement of said storage device that is a function of the lateral spacing divided by the longitudinal shift between adjacent recorded tracks.

15. A parallel to serial card converter for a tabulating card having information recorded thereon at a plurality of spaced rows of index positions extending in one direction of the card and a plurality of spaced columns of recording positions extending in a direction transversely of said rows of index positions, comprising the combination of means for feeding the card in the direction of extent of said columns of recording positions thereon, sensing means in the feed path and having a row of parallel sensing elements aligned with and corresponding in number to the number of columns of recording positions on the card, a cyclically accessible magnetic storage drum having a magnetizable recording surface, means for rotatably driving the storage drum along a predetermined path synchronously with the feeding of the card row by row past said sensing means, a plurality of stationary magnetic recording elements corresponding in number to and each connected to a different one of said sensing elements, said recording elements extending normal to the axis of the drum to record information on the recording surface thereof in a track extending in the direction of rotational movement of the drum, means synchronized with the feeding of the card row by row past the sensing means and axially shifting the storage drum relative to the recording elements to cause information sensed from a card fed past the sensing means to be recorded on the storage drum in a pattern of parallel, laterally spaced and longitudinally shifted tracks corresponding in number to the number of rows of index positions of the card, and a plurality of magnetic reading elements arrayed generally transversely of the path of rotational movement of said storage drum and corresponding in number to and each aligned with and intercepting a different one of the recorded tracks in an axially shifted position of the storage drum.

16. A parallel to serial card converter in accordance with claim 15 above wherein said magnetic reading elements are arrayed at an angle to the rotational axis of the drum that is a function of the amount of rotational displacement divided by the axial displacement of the drum occurring during the sensing of the total number of rows of index positions of the card fed past the sensing means.

17. A parallel to serial card converter in accordance with claim 15 above wherein the axial shift of the storage drum is interrupted after the magnetization pattern has been recorded on the storage drum and while the entire pattern is presented to the magnetic reading elements after which the storage drum is axially shifted in the return direction.

18. A parallel to serial card converter in accordance with claim 15 above wherein said magnetic reading elements are shifted with the storage drum.

19. A parallel to serial card converter for a tabulating card having information recorded therein at a plurality of spaced rows of index positions extending in one direction of the card and a plurality of spaced columns of information recording positions extending in a direction transversely of said rows of index positions, comprising, in combination, means for feeding the card in the direction of extent of said columns of information recording positions thereon, sensing means in the feed path and having a plurality of parallel sensing elements aligned with and corresponding in number to the number of columns of information recording positions on the card, a movable storage device having a magnetizable recording surface, means for driving the storage device for movement along a predetermined path synchronously with the feeding of the card row by row past said sensing means, a plurality of magnetic recording elements corresponding in number to and each connected to a different one of said sensing elements to record information on the recording surface of the storage device in a track extending in the direction of movement of the storage device, means synchronized with the feeding of the card past the sensing means and shifting the recording elements relative to the storage device in a direction transversely of the aforesaid direction of movement of the storage device to cause information sensed from a card fed past the sensing means to be magnetically recorded on the storage device in a magnetization pattern of parallel, laterally spaced and longitudinally shifted tracks corresponding in number to the number of rows of information designating index positions of the card, and a plurality of magnetic reading elements arrayed generally transversely of the path of movement of said storage device and corresponding in number to and each aligned with and intercepting a different one of the recorded tracks on the storage device.

20. A parallel to serial card converter in accordance with claim 19 above wherein said movable storage device has a flat recording surface.

References Cited

UNITED STATES PATENTS

| | | | |
|---|---|---|---|
| 2,831,058 | 4/1958 | Finch | 178—26 |
| 3,164,675 | 1/1965 | Buhrendorf | 178—66 |
| 3,226,690 | 12/1965 | Sharp | 340—172.5 |

MAYNARD R. WILBUR, *Primary Examiner.*

J. WALLACE, *Assistant Examiner.*